United States Patent [19]
McKavanagh

[11] Patent Number: 5,150,881
[45] Date of Patent: Sep. 29, 1992

[54] GATE VALVE SLEEVE

[76] Inventor: Thomas P. McKavanagh, 95 Temperance Street, Aurora, Ontario, Canada, L4G 2R1

[21] Appl. No.: 793,526

[22] Filed: Nov. 18, 1991

[51] Int. Cl.$^5$ .................. F16K 3/02; F16K 3/312; F16K 25/00
[52] U.S. Cl. .................... 251/174; 251/195; 251/327; 251/328; 277/164; 277/213; 137/375
[58] Field of Search ............ 257/174, 326, 327, 328, 257/329, 193, 195; 137/375; 277/164, 213

[56] References Cited

U.S. PATENT DOCUMENTS

| | | | |
|---|---|---|---|
| 250,929 | 12/1881 | Lewis | 277/213 |
| 2,243,863 | 6/1941 | Hoy | 251/174 |
| 2,303,090 | 11/1942 | Pranger et al. | 277/213 |
| 2,471,941 | 5/1949 | Downey | 251/174 |
| 2,777,664 | 1/1957 | Bryant | 251/174 |
| 2,985,422 | 5/1961 | Anderson et al. | 251/328 |
| 3,000,608 | 9/1961 | Williams | 251/328 |
| 3,266,769 | 8/1966 | Shand | 251/174 |
| 3,333,816 | 8/1967 | Williams et al. | 251/328 |
| 3,784,214 | 1/1974 | Tampler | 277/213 |
| 4,257,447 | 3/1981 | Clarkson | 251/328 |
| 4,685,611 | 8/1987 | Scobie et al. | 251/317 |
| 4,688,597 | 8/1987 | Clarkson et al. | 251/328 |
| 4,702,481 | 10/1987 | Brammer | 277/213 |
| 4,749,168 | 6/1988 | Maxwell et al. | 251/328 |
| 4,895,181 | 1/1990 | McKavanagh | 251/328 |

*Primary Examiner*—George L. Walton

[57] ABSTRACT

A sealing sleeve for a gate valve is disclosed which is designed to respond to movements of the gate of the valve in a particular manner. The seal undergoes an axial compressive type movement as the gate is moved between opposed sealing sleeves and this causes a predetermined radially inward buckling of an intermediate wall section of the sealing sleeve. This predetermined buckling creates a spring bias in the sleeve, urging the sleeve to return to the original, less stressed condition. Preferably, the sleeve is of a composite structure and a particular component of the intermediate wall section creates this spring bias. This structure has improved operating characteristics and accommodates a wider range of resilient materials to be used for the sealing sleeve.

17 Claims, 4 Drawing Sheets

GATE VALVE SLEEVE

FIELD OF THE INVENTION

The present invention relates to gate valves and, in particular, an improved sealing arrangement for a gate valve.

BACKGROUND OF THE INVENTION

A particular gate valve sleeve is taught in U.S. Pat. No. 4,895,181. The sleeve disclosed in this patent uses a stiffening ring enclosed within the sleeve. Other arrangements for gate valve sleeves are disclosed in U.S. Pat. No. 4,257,447 (Clarkson), U.S. Pat. No. 2,873,943 (Williams), U.S. Pat. No. 3,659,822 (Nagi), U.S. Pat. No. 4,201,365 (Paptzun et al), U.S. Pat. No. 4,603,864 (Raftis), U.S. Pat. No. 4,623,122 (Gambetta), and U.S. Pat. No. 4,625,942 (Nelson).

In most cases, the gate valve includes an internal sleeve arrangement made of a rubber type material which resiliently distorts upon movement of the gate of the gate valve between the sealing member and returns to seal with a like seal member when the gate is fully withdrawn.

Gate valves are subject to widely varying operating conditions and preferably must satisfactorily operate under these widely varying conditions. For example, the gate valve could be opened and closed several times daily and, therefore, must be capable of opening and closing effectively. In other cases, the gate valve may be left in one position for a substantial period of time and then moved to a second position. The sleeve of the gate valve must be capable of responding to these changing conditions and any tendency of the material of the sleeve to maintain a particular set should be minimal. Other factors affecting the choice of the sealing material include the abrasiveness of the material being conveyed through the pipe, the temperature of the fluid, and the corrosiveness of the fluid.

In the past, there has been a tendency to find an elastomeric material or composite material which effectively addresses the widely varying characteristics for the sealing sleeve. In the case of U.S. Pat. No. 4,895,181, the rigidity adjacent the sealing end of the sleeve was improved by embedding directly therein a stiffening ring. Unfortunately, the widely varying operating conditions in combination with the material to be carried renders the choice of material for the sealing sleeve very difficult. There remains a need to provide a simple sealing sleeve arrangement which is capable of operating under widely varying conditions.

SUMMARY OF THE INVENTION

A cylindrical type sleeve for a gate valve, according to the present invention, comprises a cylindrical-like body made of a resilient material and having a sealing end for engaging a displaceable gate of the gate valve, an anchoring end for securing of said seal adjacent a gate valve, and an intermediate section joining the sealing end and the anchoring end and accommodating controlled compressive distortion of the intermediate section as the sealing end is forced towards the flanged end by the gate of the gate valve. The intermediate section is preferably of a composite construction and includes a compressible spring collar which mechanically produces a spring bias when compressed by said sealing end. The intermediate section opposes any compressive distortion movement and creates a bias during any compressive distortion movement of the sleeve and urges the sleeve to return the intermediate section to the wall configuration prior to any compressive distortion movement of the intermediate section. The use of a spring collar associated with the intermediate section provides a mechanical means for assisting the sleeve to return to its original condition and does not rely solely on the natural resiliency of the material of the seal to urge the seal to the original condition. In this way, problems associated with material taking on a set position is reduced as a spring bias has been created which urges the sleeve to the original extended position.

With the cylindrical type sleeve as discussed above, the amount of resilient material can be reduced as the bias necessary to return the sleeve to its original position is being created by the spring collar. This results in not only a more reliable cylindrical type sleeve for a gate valve, but also one which is economical to produce.

In addition, the intermediate section is designed to buckle radially inwardly as the sealing end is forced towards the flanged end. This radial inward distortion is preferable, as it will be opposed by the pressure of the fluid within the seal which, again, will create a strong bias trying to return the seal to its original position. This is especially advantageous because the additional bias increases as the fluid pressure increases, that is, the sealing bias is strengthened when it is needed the most.

Again, the invention results, not only in a more reliable cylindrical type sleeve for a gate valve, but also one which is more economical to produce because less elastomeric material is used as well as allowing the use of less expensive rubber type materials in certain laser.

The sleeve is also improved because the "nose" of the spring collar serves to concentrate the axial bias along a narrower sealing ring at the nose of the sleeve, that is, the sealing pressure is increased by concentrating the axial force within a smaller area.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
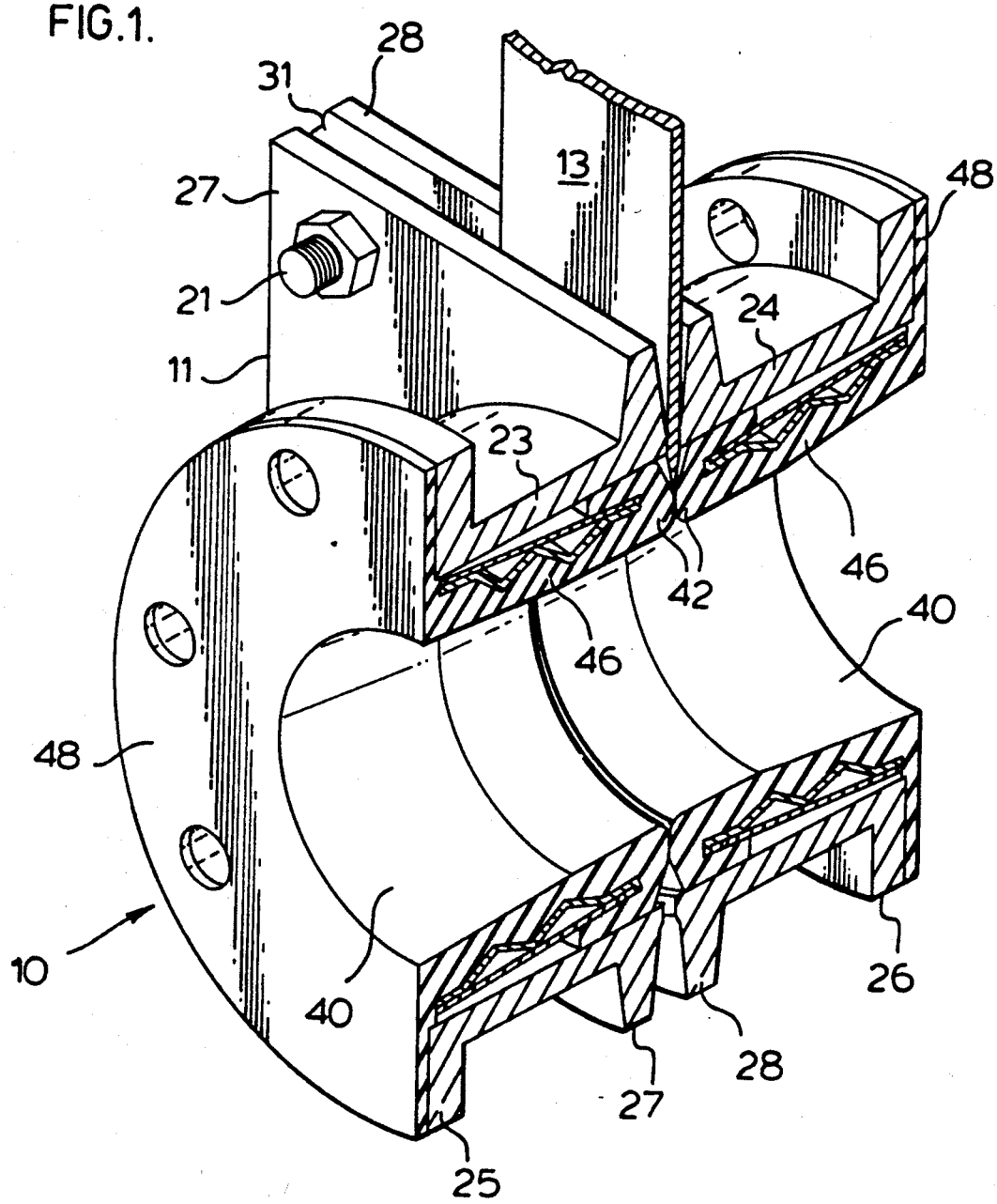
FIG. 1 is a perspective cutaway of a gate valve assembly.

A gate valve, generally shown as 10 in FIG. 1, includes a housing 11 made up of opposed housing halves 23 and 24. The housing halves have opposed interior flanges 27 and 28 which are spaced from one another by spacer strips 31. This defines a central gap through which the plate gate 13 can move up or down to either open or restrict the passageway through the gate valve. The opposed housing halves 23 and 24 are secured together by a plurality of nut and bolt arrangements, generally shown as 21. A sealing sleeve, generally shown as 40, is associated with each housing half 23 and 24. These sealing sleeves include a sealing end portion 42, an intermediate section 46 which is the section which will accommodate compressive movement of the sleeve when the plate gate 13 is moved between the sealing sleeves, and an anchoring flange 48. The anchoring flange 48 not only anchors the sleeve, but forms a gasket for sealing with pipe flanges when the outer circular flanges 25 and 26 are brought into engagement with opposed pipe flanges. A flanged anchoring end is shown, but other anchoring ends can be used, depending upon the structure of the gate valve.

Figure 2:
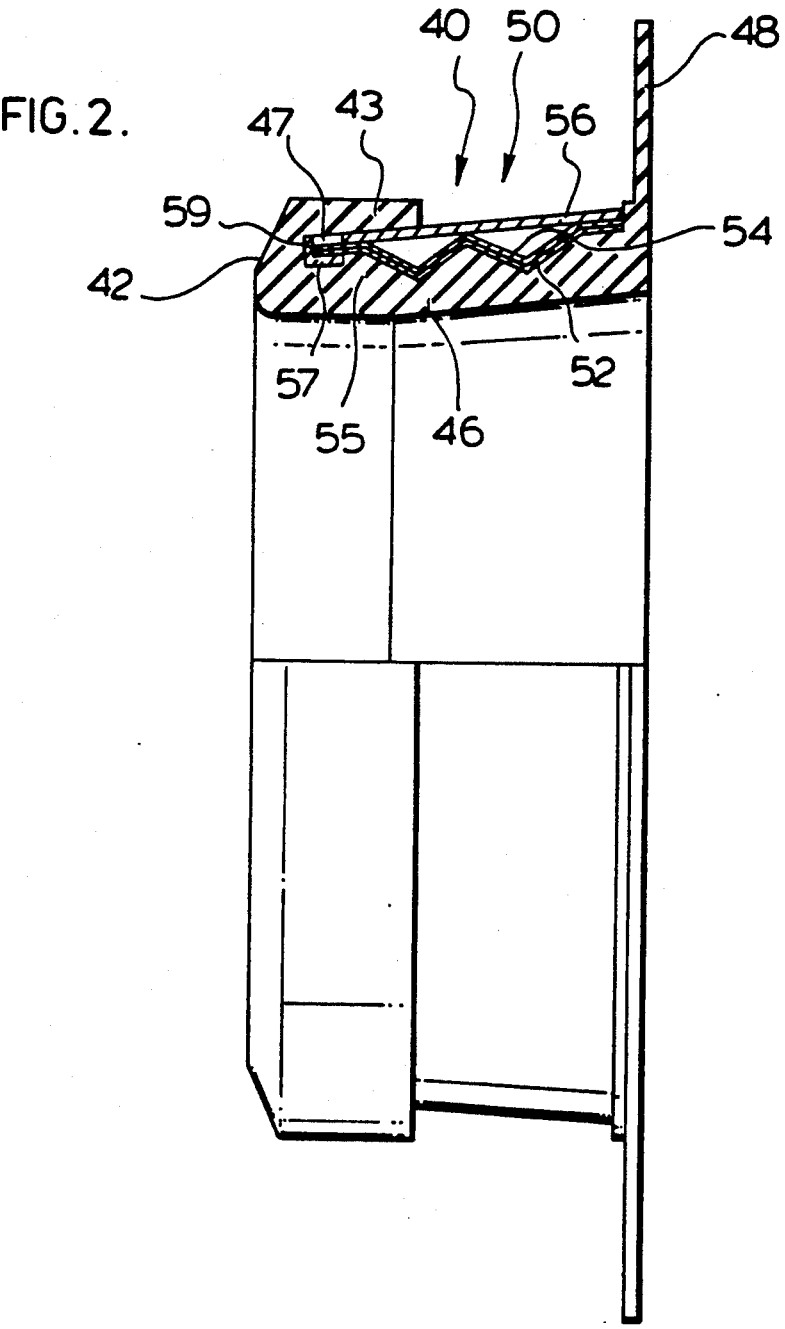
FIG. 2 is a side view, partial cutaway of the cylindrical type sleeve.

The structure of the particular sealing sleeve is shown in FIG. 2. The upper portion of FIG. 2 shows a cutaway of the sealing member and the lower portion shows the entire sealing member. It can be appreciated that when the gate 13 is in a cleared position, sealing ends 42 of opposed sealing sleeves 40 abut and form a seal therebetween. As the gate 13 is moved between the sealing sleeves, each sealing sleeve undergoes a compressive distortion movement to accommodate the thickness of the gate 13. To accommodate the compressive distortion movement required of the sealing sleeve 40, the intermediate section has been provided with a spring collar 50.

Figure 3:
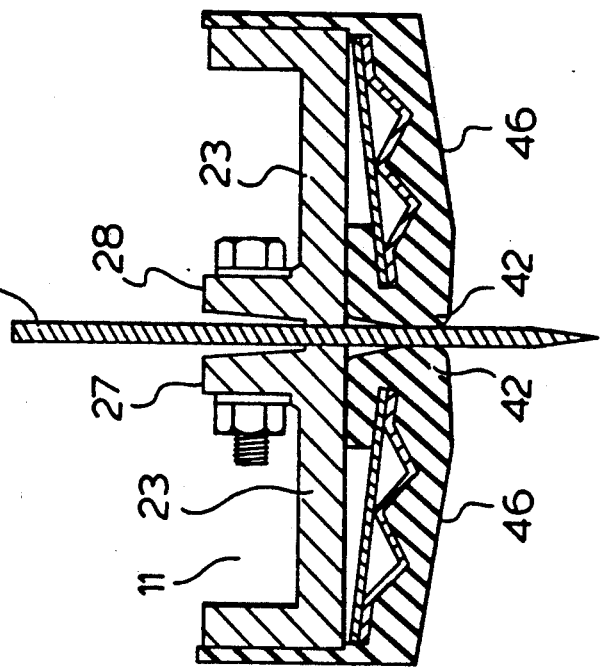
FIGS. 3 and 4 are sectional views through a gate valve with the valve in the open or closed position.
Figure 4:
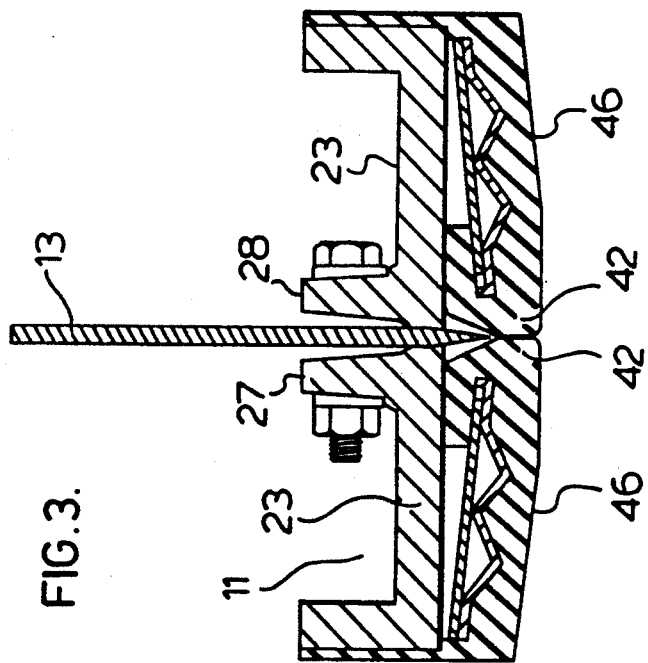
Figure 7:
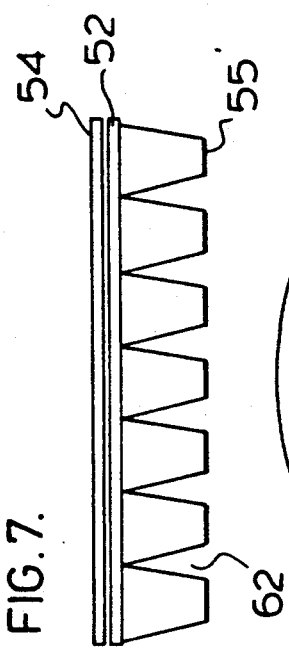
FIG. 7 is a side view of the spring collars of FIG. 6.
Figure 8:
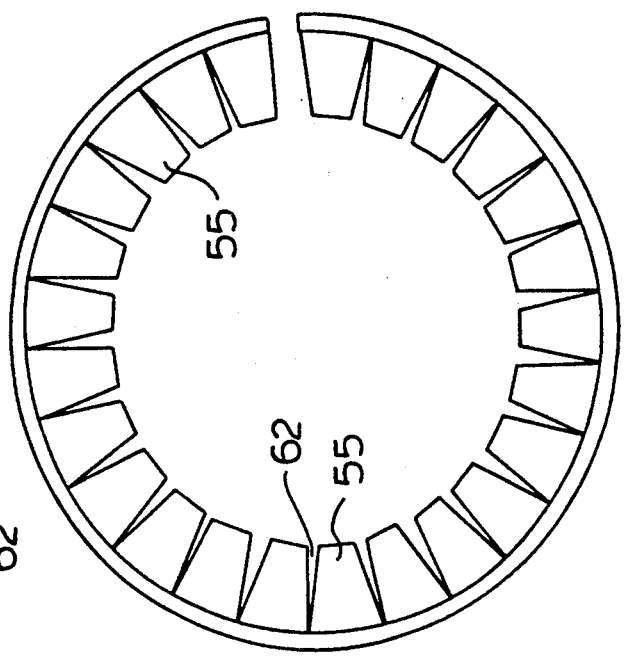
FIG. 8 shows the spring collars of FIGS. 6 and 7 deformed into a circular band.
Figure 6:
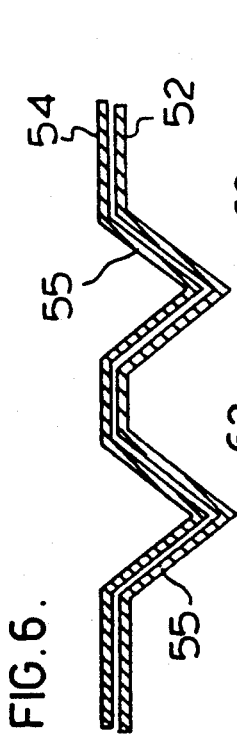
FIG. 6 is a sectional view of two spring collars of the type shown in FIG. 5.
Figure 5:
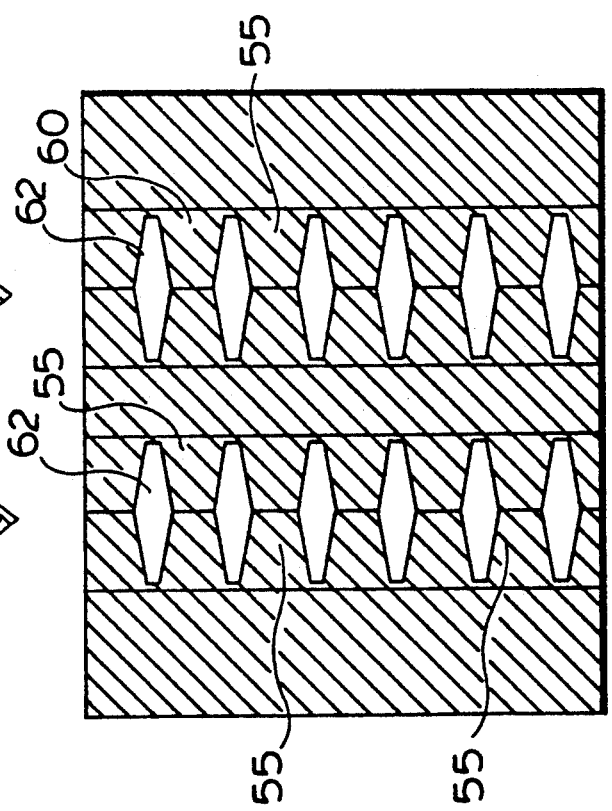
FIG. 5 is a top view of a spring collar prior to being formed into a cylindrical shape.

FIG. 3 shows the sealing sleeve with the gate 13 fully withdrawn, with FIG. 4 illustrating the movement of the sealing sleeve with the gate partially closed.

In the embodiment shown in FIG. 2, two metal members 52 and 54 are provided in back-to-back relationship and have a corrugated center portion defined by aligned 'V' shaped portions 55. Each of these 'V' shaped portions produce a spring type bias during compression of the intermediate section and cause an inward buckling of the intermediate section such that the intermediate section distorts radially inwardly, as shown in FIG. 4. This radial inward distortion is preferable, as it will be opposed by the pressure of the fluid within the seal which, again, will create a strong bias trying to return the seal to its original position.

To further ensure the inward buckling of the intermediate section, a stiff backing member 56 can be provided to avoid outward buckling of the intermediate section. The use of this backing member may be required in larger sleeves. The backing member 56 is received within the walls of the sleeve and a small space is provided to allow movement of the intermediate section and the end seal without compressive forces being applied axially to the backing member 56. The backing member also serves to stiffen the sleeve to avoid inward collapse of the sleeve during movement of the gate.

It can be seen with this arrangement that the compressible spring collar 50 opposes axial compression or distortion of the sealing sleeve 40 and provides a strong bias urging the sealing sleeve to return to its original condition. It can also be seen that the spring collar 50 is positioned between the anchoring flange 48 and the sealing end 42 to direct the compressive force towards the portion of the sealing end 42 effecting a seal either with the gate or a like sealing end of an opposed sealing sleeve. The seal end also includes a force distributing plate 57 such that end 59 of spring collar 50 does not cut through the sealing end 42. This force distributing plate 57 can be made integral with end 59 if desired. A similar force distributing arrangement can be provided adjacent the anchoring end, if required.

The spring collar 50 is easily inserted within the sealing sleeve due to the end seal 42 including a flange 43 defining a closed pocket 47 between the intermediate section 46 and the flange 43 into which one end of the backing member 56 and the spring collars 52 and 54 are inserted and maintained. The other end of the backing member and the spring collars are appropriately anchored adjacent the anchoring flange 48. Thus, these members can be inserted into the resilient body of the sealing sleeve 40.

As can be appreciated from the above, the inward buckling of the intermediate section, which is predetermined by the shape and relationship with the spring collar 50, advantageously uses the fluid pressure between the sealing sleeve to oppose this inward buckling and create a further force encouraging an effective seal with either the gate valve or with an opposed sealing end of a further sleeve. This fluid pressure creating a bias in combination with the mechanical bias created by the spring collar makes the response of the sealing sleeve positive and does not rely on the inherent resiliency of the rubber type sealing material of conventional sealing sleeves. As the pressure of the fluid increases, a larger sealing force is created.

The backing member, generally shown in FIG. 2, will preferably be of a ring configuration to provide the backing to the spring collar 52 and 54.

One type of spring collar is shown in FIGS. 5 through 8. In this case, the spring collars are preferably made in a flat configuration and have 'V' shaped portions 55 which can be deformed into the flat material in a conventional manner. The 'V' shaped portions include gaps 62 to allow the flat members shown in FIG. 5 to be deformed into the generally circular-like configuration of FIG. 8 and also accommodate any inward buckling of the intermediate section during movement of the gate 13 and allow the sections to function generally independently of the adjacent 'V' shaped portions. Preferably, the spring collar will then be secured in some suitable manner for insertion within the sealing sleeve. Although the spring collar is preferably made of a metal material, it could also be made of a plastic material and possibly could be of an extruded plastic material which is subsequently cut or punched to produce the gap 62. It can also be appreciated that the spring collar could be injected moulded. Gaps 62 are preferably retained to allow the individual segments of the spring collar to act independently and accommodate gate movement. The spring collar could also be formed in axial strips which collectively form a collar type member. These axial strips could collectively form a ring or merely be spaced in a ring pattern. Each strip would create its own bias and respond to movement of the gate in the same manner.

It is believed that the combination of a resilient rubber-like material for the end seal and for the body portion of the intermediate section and for the anchoring and in combination with a spring collar, shaped to produce a particular deformation and preferably a radially inward buckling of the intermediate section, produces an effective system which can be manufactured at costs very similar to conventional sleeves while providing more positive sealing and more ability to satisfy the widely varying operating conditions of a gate valve. The combination of the created mechanical force and the resilient material of the sleeve simplifies the selection of the resilient material and allows more exotic, highly temperature resistant and/or chemical resistant materials to be used, as the other desired properties are provided by the spring bias. For example, the intermediate can have only a thin section of resilient material effectively covering the spring collar, with the spring collar urging the seal to the less stressed state during withdrawal of a gate. This thin wall also accommodates inward buckling of the intermediate section.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A sealing arrangement for a gate valve comprising at least one cylindrical-like seal, each cylindrical like seal having a body made of a resilient material and a cooperating buckling means, said at least one seal having a sealing end engaging a gate of the gate valve, an anchoring end securing said at least one seal in the gate valve, and an intermediate section joining said sealing end and said anchoring end and accommodating controlled buckling of said buckling means and said intermediate section as said sealing end is forced toward said anchoring end during movement of said gate in a closing direction; said intermediate section having a recess formed therein with said buckling means disposed within said recess, said controlled buckling being predetermined by the configuration of said buckling means to buckle in a radial direction of said seal distorting said recess as said sealing end moves towards said anchoring end, said buckling means transferring forces between said sealing end and said anchoring end and creating a bias during controlled buckling of said intermediate section urging said intermediate section to return to the wall configuration prior to controlled buckling of said intermediate section when said gate is moved in an opening direction.

2. A sealing arrangement as claimed in claim 1 wherein said buckling means buckles in a radially inward direction whereby said intermediate section cooperates with fluid pressure exerted thereon as fluid passes through said seal arrangement to increase the effective axial sealing pressure between said sealing end and said gate as said fluid pressure urges said buckling means to reduce any inward buckling of said intermediate section.

3. A cylindrical type seal as claimed in claim 1 wherein said buckling means includes a corrugated metal arrangement adjacent a radially exterior wall of said intermediate section.

4. A cylindrical type seal as claimed in claim 1 wherein said buckling means has a series of resilient buckling portions spaced circumferentially about said intermediate section.

5. A cylindrical type seal as claimed in claim 4 wherein said resilient buckling portions are of a composite structure and have a metal portion designed to buckle radially inwardly.

6. A cylindrical type seal as claimed in claim 5 wherein said metal portion in an unstressed state of said seal has a 'V' shape portion directed with the point of the 'V' shape directed radially inwardly.

7. A cylindrical type seal as claimed in claim 6 wherein said metal portion when deformed to produce a buckling deformation creates a return bias directed between said anchoring end and said sealing end focused in said sealing end to enhance the sealing pressure between said sealing end and the gate or a like sealing end of an oppositely located cylindrical type seal.

8. A cylindrical type seal as claimed in claim 7 wherein said metal portion has associated therewith a backing member which limits the buckling movement of said metal portion to a radially inward buckling movement.

9. A cylindrical type seal as claimed in claim 8 wherein said backing member is mounted to accommodate limited axial compression of said cylindrical type seal sufficient to produce a buckling of said metal portion without any substantial axial loading of said backing member.

10. A cylindrical type seal as claimed in claim 8 wherein said metal portion includes two 'V' shaped portions each of which buckle in the same direction.

11. A cylindrical type seal as claimed in claim 10 wherein said metal portion form a ring about the circumference of said intermediate section.

12. A cylindrical type seal as claimed in claim 11 wherein said 'V' shaped portions are split into segments spaced circumferentially about said cylindrical seal.

13. A cylindrical type seal as claimed in claim 12 including a further metal portion of the same shape as the first metal portion and directly therebehind to increase the bias urging the intermediate portion to return to the wall configuration prior to controlled buckling of said intermediate section when said gate is moved in an opening direction.

14. A cylindrical type seal comprising a cylindrical like body made of a resilient material and having a sealing end for engaging a gate of the gate valve and an anchoring end for securing of said seal in the gate valve, and an intermediate section joining said sealing end and said anchoring end and accommodating controlled compression of said intermediate section when said sealing end is forced towards said anchoring end by a gate of a gate valve, said intermediate section being of a composite structure and including a recess having a compressible spring collar about said intermediate section which mechanically produces a strong spring bias when compressed by said sealing end being formed tyowards said anchoring end, said spring collar when compressed buckling in a direction distorting said recess and substantially altering the wall configuration of said intermediate section and creating a bias urging said intermediate section to return to the wall configuration prior to any compressive movement of the intermediate section.

15. A cylindrical type seal as claimed in claim 14 wherein said recess includes a pocket arrangement on the exterior thereof into which said spring collar is inserted and maintained.

16. A cylindrical type seal as claimed in claim 14 wherein the thickness of the resilient material in said intermediate section is relatively thin and acts as a cover for the spring collar.

17. A cylindrical type seal as claimed in claim 16 wherein said resilient material is an exotic elastomeric material having high temperature resistance and chemical resistance and said spring collar provides the required resiliency to return to a less stressed state during withdrawal of a gate.

* * * * *